(12) United States Patent
Grabau

(10) Patent No.: US 7,802,961 B2
(45) Date of Patent: Sep. 28, 2010

(54) OFFSHORE WIND TURBINE WITH DEVICE FOR ICE PREVENTION

(75) Inventor: Peter Grabau, Kolding (DK)

(73) Assignee: LM Glasfiber A/S, Lunderskov (DK)

( * ) Notice: Subject to any disclaimer, the term of this patent is extended or adjusted under 35 U.S.C. 154(b) by 740 days.

(21) Appl. No.: 11/794,163

(22) PCT Filed: Dec. 21, 2005

(86) PCT No.: PCT/DK2005/000812

§ 371 (c)(1),
(2), (4) Date: Jul. 13, 2007

(87) PCT Pub. No.: WO2006/066591

PCT Pub. Date: Jun. 29, 2006

(65) Prior Publication Data

US 2008/0317583 A1    Dec. 25, 2008

(30) Foreign Application Priority Data

Dec. 21, 2004 (DK) ............................. 2004 01968

(51) Int. Cl.
*F03D 11/00* (2006.01)

(52) U.S. Cl. .................... 415/4.3; 415/4.5; 415/116; 415/232

(58) Field of Classification Search ............... 415/4.3, 415/4.5, 116, 117, 118, 202; 416/61, 146 R, 416/248; 134/47, 144, 148, 198; 239/550; 290/44, 55
See application file for complete search history.

(56) References Cited

U.S. PATENT DOCUMENTS

| | | | | |
|---|---|---|---|---|
| 2,576,487 | A * | 11/1951 | Stanley | 244/134 C |
| 6,890,152 | B1 * | 5/2005 | Thisted | 416/1 |
| 7,078,658 | B2 * | 7/2006 | Brunner et al. | 219/529 |
| 7,217,091 | B2 * | 5/2007 | LeMieux | 416/95 |

\* cited by examiner

*Primary Examiner*—Ninh H Nguyen
(74) *Attorney, Agent, or Firm*—The Nath Law Group; Jerald L. Meyer; Derek Richmond

(57) ABSTRACT

Offshore wind turbine (14) including a tower (1) rising above sea level (12) and one or ore blades (4), which can be put into rotation by wind. The offshore wind turbine includes a pump (6), which is adapted to pump sea water (13) up form the sea. At the delivery side the pump (6) communicates with nozzles (8, 9), said nozzles being adapted to direct sea water to the surface of the blades (4).

12 Claims, 1 Drawing Sheet

OFFSHORE WIND TURBINE WITH DEVICE FOR ICE PREVENTION

TECHNICAL FIELD

The invention relates to an offshore wind turbine including a tower rising above sea level and one or more blades, which can be put into rotation by wind, and where the offshore wind turbine includes a pump, which is adapted to pump sea water up from the sea.

BACKGROUND ART

Modern wind turbines, also called wind motors or wind engines, are employed to produce electricity, They are often very large structures with blades measuring up to 60 meters or more, and which are made from fibre-reinforced polymer shells.

Icing of wind turbine blades is a widespread problem with several negative results. Icing can change the profile of the blade and thus the aerodynamic properties of the blade, impeding efficiency. Furthermore, non-uniform icing can cause severe asymmetric stress to the wind turbine structure, which can result in the operation having to be interrupted.

DE 196 21 485 discloses a wind turbine blade, the inside of which is heated by means of warm air with a view to deicing.

WO 98/53200 discloses a wind turbine blade, which can be defrosted by means of heating elements Including conductive fibres.

U.S. Pat. No. 4,060,212 discloses the method of deicing rotor blades on helicopters by means of microwaves.

Background art also discloses the method of preventing icing on plane wings by spraying the plane wings with a defrosting agent immediately prior to take-off.

During recent years, wind turbines have been erected offshore, as there the velocity of wind is great due to the absence of leeward. Also, by placing these very tall wind turbines with blades of up to 60 m or more offshore, nuisances from placing such wind turbines in areas of natural beauty are avoided.

U.S. Pat. No. 6,520,737 B1 discloses an offshore wind turbine with a pump able to pump sea water up for cooling purposes.

BRIEF DESCRIPTION OF THE INVENTION

The object of the invention is to show a simple and efficient system to prevent icing on the blades of an offshore wind turbine.

According to the invention the object is achieved by the pump of the offshore wind turbine, mentioned in the preamble, at the delivery side communicating with nozzles, said nozzles being adapted to direct sea water to the surface of the blades. It is a well-known fact that sea water includes salt, and thus it has a lower freezing point than fresh water. By directing sea water to the surface of the blades, ice already formed on the surface of the blade of the wind turbine, can be melted. Ice control can, however, also be effected preventively, as the surface of the blade can be supplied with salt water thus leaving behind salt on the surface after evaporation.

Offshore wind turbines can be constructed so that the blades extend radially out of a hub, said blades and said hub constituting a rotor, which is mounted on a substantially horizontal main shaft. The main shaft can be pivotally mounted in a nacelle mounted on top of the tower, said nacelle being able to pivot around a vertical shaft in relation to the tower, hereby being able to adjust the rotor plane of the blades in relation to the direction of the wind.

According to one embodiment the wind turbine can include nozzles, which are placed between the tower and the blades, and which are adapted to spray sea water in the direction of the rotor plane. The term "spray" is to be understood as any form of emitting water, i.e. in form of one or more water jets, water drops or water spray.

The nozzles can for instance be placed on a length corresponding to the length of the blade of the wind turbine. The nozzles can emit sea water during the rotation of the rotor, hereby all blades, typically there are three of them, are supplied with sea water while rotating. The wind turbine can also include a system which ensures that each individual blade can be brought to a temporary halt across from the tower for a short time.

According to one embodiment the nozzles can be fixed to the nacelle, so that said nozzles face the rotor plane irrespective of the orientation of said rotor plane. Thus the surface of the blades can always be supplied with sea water irrespective of the yaw direction. The nozzles can for instance be fixed to a pole extending radially out of the nacelle, primarily along the tower.

Alternatively the nozzles can be fixed to the tower.

According to an advantageous embodiment, nozzles are fixed along the circumference of the tower, whereby the blades can be supplied with sea water irrespective of the yaw direction of the nacelle.

The offshore wind turbine can also include one or more nozzles which are placed inside or on the rotor hub. Such nozzles can possibly be adapted to emit sea water radially out onto the surface of the blades.

According to a particular embodiment, the nozzles are adapted to generate a cloud from drops of sea water in front of the rotor. This can be achieved by placing the nozzles on or inside the hub. If the main shaft is hollow, a sea water feeder can be led through the main shaft and to the nozzles.

One or more nozzles can also be placed on the nacelle and/or the upper part of the tower thus generating a cloud in front of the rotor.

According to one embodiment the offshore wind turbine includes a control system for activating the pump and/or nozzles.

The control system can include an ice sensor, which can be placed on a blade, the hub, the nacelle or the tower. When said sensor registers icing, the system can activate the pump and/or the nozzles.

Alternatively the system can be adapted to activate/deactivate the pump and/or the nozzles by measuring the power of the wind turbine. A wind turbine typically produces a certain power at a certain wind velocity. A sudden decrease in power can be an indication of icing on the blades. Thus the system can detect said decrease in power and activate the pump and/or nozzles.

The system can also include an anemometer so that it can be determined whether the decrease in power is caused by a drop in the wind velocity.

At the suction side the pump can be connected to a suction hose extending down below sea level. The suction hose can have an opening close the bottom of the sea. As salt water is the heavier, the higher the salt concentration, the salt concentration is typically highest at the bottom of the sea. By sucking up salt water with the highest salt concentration possible, efficient ice control can be achieved.

The pump can also be placed below sea level, possibly inside the tower. This can be advantageous, as pumping up water to high levels is easier than sucking it up.

Typically ordinary salt water has a salt concentration of 3.5%. At this concentration salt water typically freezes at −3°

C. Thus the system can be adapted to deactivate the pump and/or the nozzles at this temperature. However, as the salt concentration on the surface of the blades can be much higher due to evaporation, the system can be adapted to deactivate the pump and/or the nozzles at any other temperature.

According to a particular embodiment the wind turbine can include an appliance, which increases the salt concentration in the salt water which is directed out onto the surface of the blades. The sea water can for instance be directed through an appliance, in which the water evaporates, causing an increased concentration. It is also possible to increase the salt concentration by means of so-called reverse osmosis. Alternatively additional salt can be added to the water.

BRIEF DESCRIPTION OF THE DRAWING

The invention is explained in detail below with reference to an embodiment shown in the drawing, in which.

BEST MODE FOR CARRYING OUT THE INVENTION

Figure 1:
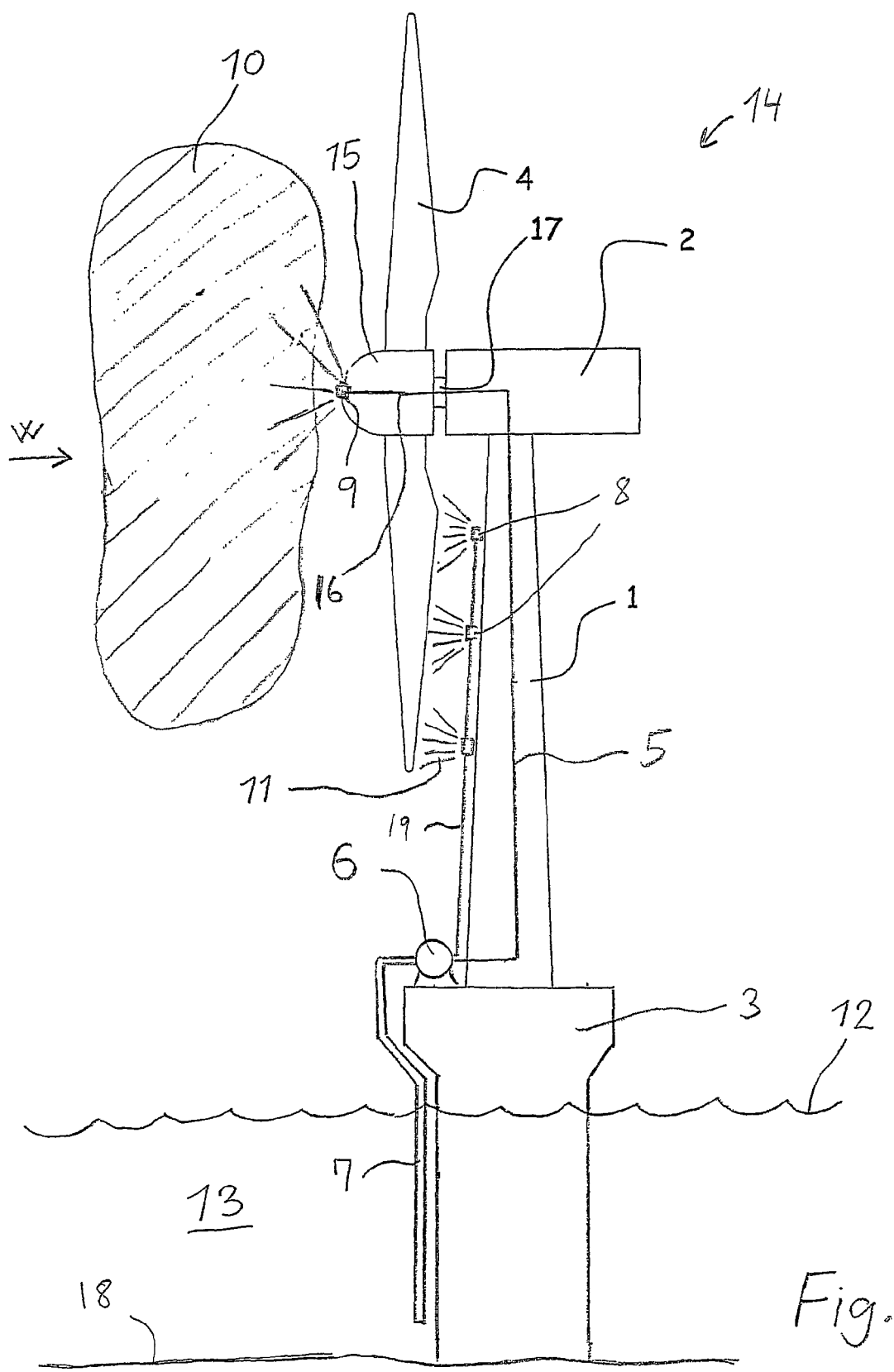
FIG. 1 is a diagrammatic view of an offshore wind turbine according to the invention.

The offshore wind turbine diagrammatically shown in FIG. 1 includes a base 3 standing at the bottom 18 of the sea 13. The base 3 which forms a part of the tower 1 of the wind turbine rises above sea level 12. The tower 1 of the wind turbine extends further up from the base and supports a nacelle 2, also called a cap of the wind turbine. A substantially horizontal main shaft 17 extends from the nacelle 2, a rotor including a hub 15 and a plurality of blades 4 being mounted on said main shaft. The nacelle 2 can yaw, which means it can pivot around a vertical shaft in relation to the tower 1, hereby being able to adjust the rotor in relation to the direction of the wind. The wind turbine shown is a so-called upwind rotor, where the wind hits the rotor before the tower 1. A pump 6 is placed on the base 3. At the suction side said pump communicates with a suction hose 7 extending down below sea level 12, thus being able to pump up sea water. At the delivery side the pump 6 communicates with two pump hoses 5, 19. One of the pump hoses 19 extends upwards along the tower 1 and communicates with a plurality of nozzles 8. Said nozzles 8 are adapted so that they can spray sea water in the direction of the rotor, i.e. the blades 4, thus supplying said blades with sea water. An arbitrary number of nozzles 8 can be provided thus obtaining an efficient distribution of sea water on the surface of the blades 4. The second pump hose 5 extends upwards through the tower 1 to the nacelle 2. From there, said pump hose extends via a feeder 16 through the main shaft 17, which is hollow, to a nozzle 9 in front of the hub 15. The nozzle 9 is adapted to spray or atomize sea water out in front of the rotor plane so that a cloud 10 is formed from very small drops of sea water. The wind, the direction of which is indicated by the arrow W, directs the cloud in the direction of the rotor plane hereby supplying the surface of the blades 4 with saline sea water.

In the embodiment shown the wind turbine includes nozzles 8 placed between the tower 1 and the rotor as well as a nozzle 9 placed in the rotor hub 15. The wind turbine does not, however, need to include both parts.

As mentioned above, the wind turbine 14 shown is an upwind rotor. The wind turbine can, however, also be a downwind rotor, where the rotor is placed behind the tower 1 seen in the direction of the wind. In this case the nozzle or the nozzles 9 can be placed on the nacelle 2 or at the top of the tower 1.

The drawing does not show a system for activating/deactivating the pump 6 and the nozzles 8, 9, Said system can include an ice sensor registering icing. Said ice sensor can be placed in an arbitrary place on the wind turbine 14 The system can also be adapted so that it activates/deactivates the pump 6 and the nozzles 8, 9 depending on the power of the wind turbine In case of icing on the blades the power typically decreases. A detection of such a decrease in power can be used to activate the pump 6 and/or the nozzles 8, 9. Furthermore the system can include a wind gauge, for instance an anemometer, whereby it can detect whether the power decrease is due to a decrease in the velocity of the wind. If the velocity of the wind has not decreased, the power decrease is typically due to ice formation on the blades.

The supply of saline sea water to the surface of the blades can also be used preventively. By supplying the surface of the blades with sea water, a very salty film can be obtained on the surface of the blades 4 after evaporation. When fresh rainwater hits the surface of the blades 4 ice is not formed until the temperature of the air drops to far below 0° C.

The offshore wind turbine can also be provided with nozzles adapted to direct or spray sea water to/onto the tower, hub, nacelle, main shaft or various measuring tools.

The invention is not limited to the embodiment shown here. Thus the invention can be used in connection with wind turbines of the kind that have a vertical shaft.

LIST OF REFERENCE NUMERALS:

1 tower
2 nacelle
3 base
4 blade
5 pump hose
6 pump
7 suction hose
8 nozzles
9 nozzle
10 cloud
11 jets
12 sea level
13 seawater
14 offshore wind turbine
15 hub
16 feeder
17 main shaft
18 bottom of the sea
19 pump hose

The invention claimed is:

1. Offshore wind turbine (14) including a tower (1) rising above sea level (12) and one or more blades (4), which can be put into rotation by wind, and where the offshore wind turbine includes a pump (6), said pump being adapted to pump sea water (13) up from the sea, characterized by the pump (6) communicating with nozzles (8, 9) at the delivery side, said nozzles being adapted to direct sea water to the surface of the blades (4).

2. Offshore wind turbine (14) according to claim 1, characterized by the blades (4) extending radially out of a hub (15), said blades and said hub constituting a rotor, which is mounted on a substantially horizontal main shaft (17).

3. Offshore wind turbine (14) according to claim 2, characterized by the main shaft (17) being pivotally mounted in a nacelle (2) mounted on top of the tower (1), said nacelle (2) being able to pivot around a vertical shaft in relation to the tower (1), hereby being able to adjust the rotor plane of the blades (4) in relation to the direction of the wind (W).

4. Offshore wind turbine (14) according to claim 1, characterized by said wind turbine including nozzles (8), which are placed between the tower (1) and the blades (4), and which are adapted to spray sea water in the direction of the rotor plane.

5. Offshore wind turbine (14) according to claim 3, characterized by the nozzles (8) being fixed to the nacelle (2), so that said nozzles face the rotor plane irrespective of the orientation of said rotor plane.

6. Offshore wind turbine (14) according to claim 4, characterized by the nozzles (8) being fixed to the tower (1).

7. Offshore wind turbine (14) according to claim 6, characterized by nozzles (8) being fixed along the circumference of the tower (1).

8. Offshore wind turbine (14) according to claim 2, characterized by said wind turbine including one or more nozzles (9), which are placed inside or on the rotor hub (15).

9. Offshore wind turbine (14) according to claim 8, characterized by the nozzles (9) being adapted to generate a cloud (10) from drops of sea water in front of the rotor.

10. Offshore wind turbine (14) according to claim 1, characterized by said wind turbine including a control system for activating the pump (6) and/or the nozzles (8, 9).

11. Offshore wind turbine (14) according to claim 10, characterized by the control system including an ice sensor, which can be placed on a blade (4), the hub (15), the nacelle (2) or the tower (1).

12. Offshore wind turbine (14) according to claim 10, characterized by the system being adapted to activate/deactivate the pump (6) and/or the nozzles (8, 9) by measuring the power of the wind turbine.

* * * * *